US011667406B1

(12) United States Patent
Caseley et al.

(10) Patent No.: US 11,667,406 B1
(45) Date of Patent: Jun. 6, 2023

(54) INERTIAL STABILIZATION SYSTEM WITH ACTIVE JITTER SUPPRESSION AND OPTICAL CONTROL

(71) Applicant: BAE Systems Information and Electronic Systems Integration Inc., Nashua, NH (US)

(72) Inventors: Clifford D. Caseley, Hudson, NH (US); John J. Polizotti, Pittsfield, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 705 days.

(21) Appl. No.: 16/705,198

(22) Filed: Dec. 5, 2019

Related U.S. Application Data

(60) Provisional application No. 62/775,581, filed on Dec. 5, 2018.

(51) Int. Cl.
  *B64G 1/28* (2006.01)
  *H04B 7/185* (2006.01)
  *B64G 1/24* (2006.01)
  *F16F 15/00* (2006.01)

(52) U.S. Cl.
  CPC .............. *B64G 1/288* (2013.01); *B64G 1/244* (2019.05); *F16F 15/002* (2013.01); *H04B 7/18515* (2013.01); *H04B 7/18534* (2013.01); *B64G 2001/245* (2013.01)

(58) Field of Classification Search
  CPC ... B64G 1/244; B64G 1/288; B64G 2001/245; F16F 15/002; H04B 7/18515; H04B 7/18534
  See application file for complete search history.

(56) References Cited

U.S. PATENT DOCUMENTS

| 4,853,528 | A  | * | 8/1989  | Byren et al. .......... G01B 11/27 250/203.6 |
| 5,517,016 | A  | * | 5/1996  | Lesh et al. ........... G01B 11/272 356/152.2 |
| 6,359,681 | B1 | * | 3/2002  | Housand et al. ....... G02B 23/00 250/342 |
| 8,355,635 | B1 | * | 1/2013  | Liu et al. ............. H04B 10/118 701/4 |
| 10,158,427 | B2 |   | 12/2018 | Carlson |
| 10,230,467 | B1 |   | 3/2019  | Haessig, Jr. et al. |
| 10,236,980 | B1 |   | 3/2019  | Carlson et al. |
| 10,277,320 | B1 |   | 4/2019  | Haessig, Jr. et al. |

(Continued)

OTHER PUBLICATIONS

Tian et al., "Inertial sensor-based multiloop control of fast steering mirror for LOS stabilization", SPIE, Optical Engineering, Vol. 55, Issue 11, Jul. 2016 (Year: 2016).*

*Primary Examiner* — Raymond S Dean
(74) *Attorney, Agent, or Firm* — Scott J. Asmus; Maine Cernota & Rardin

(57) ABSTRACT

A three-loop inertial stabilization system with active jitter suppression and optical control to reduce line-of-sight (LOS) jitter based on platform induced motion in cantilevered gimbal systems. A first loop comprises at least one rate sensor, a Kalman state estimator, and a rate to angle module. A second loop comprises a mirror system, a focal plane and centroid processing module, an open-loop closed loop selector, a signal combiner and a loop integrator. A third loop comprises a fast steering mirror, offload module and at least one gimbal motor driver, wherein the three loops suppress the jitter of the cantilevered gimbal system.

11 Claims, 12 Drawing Sheets

(56) References Cited

U.S. PATENT DOCUMENTS

| | | | |
|---|---|---|---|
| 10,277,321 B1 | 4/2019 | Carlson et al. | |
| 10,298,327 B1* | 5/2019 | Carlson et al. | H04B 10/25 |
| 10,381,797 B1 | 8/2019 | Ryba et al. | |
| 10,495,839 B1 | 12/2019 | Carlson et al. | |
| 2007/0031151 A1* | 2/2007 | Cunningham et al. | H04B 10/1127 398/131 |
| 2009/0324236 A1* | 12/2009 | Wu et al. | H04B 10/118 398/122 |
| 2018/0011306 A1* | 1/2018 | Babnick et al. | G01S 7/4802 |
| 2018/0262271 A1* | 9/2018 | Carlson | G01C 21/025 |

\* cited by examiner

BEAM STABILIZATION ARCHITECTURE

THREE LOOP HIGH LEVEL METHOD STEPS

FIRST LOOP DETAIL STEPS

SECOND LOOP DETAIL STEPS

THIRD LOOP DETAIL STEPS

800

| Angular PSD requirement | |
|---|---|
| Frequency Bin | Minimum RMS Value (urads) |
| 0.1-0.5 | 88.81 |
| 0.5-1.0 | 30.71 |
| 1.0-5.0 | 27.23 |
| 5.0-10 | 9.47 |
| 10-50 | 8.40 |
| 50-100 | 2.92 |
| 100-500 | 2.60 |
| 500-1000 | 0.90 |
| 1000-2000 | 0.630 |
| Total | 98.73 |

ANGULAR VIBRATION ENVIRONMENT

900

| Linear PSD requirement | |
|---|---|
| Frequency Bin | Minimum RMS Value (g's) |
| 1.0-5.0 | 2.23E-02 |
| 5.0-10 | 2.48E-02 |
| 10-50 | 7.06E-02 |
| 50-100 | 7.86E-02 |
| 100-500 | 9.53E-02 |
| 500-1000 | 3.05E-02 |
| 1000-2000 | 2.05E-02 |
| Total | 0.151 |

LINEAR VIBRATION ENVIRONMENT

JITTER REDUCTION WITH INERTIAL ACTUATORS

1100

LOOP FILTER JITTER REDUCTION

1200

GIMBAL MOTOR WAVEFORM

INERTIAL STABILIZATION SYSTEM WITH ACTIVE JITTER SUPPRESSION AND OPTICAL CONTROL

CROSS REFERENCE TO RELATED APPLICATIONS

This application claims the benefit from U.S. Provisional Pat. Application No. 62/775,581, filed Dec. 5, 2018, the content of which is incorporated by reference herein its entirety.

FIELD

The disclosure relates to wireless telecommunications, and more particularly, to reducing line-of-sight (LOS) jitter based on platform induced motion in cantilevered gimbal systems.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes wired items such as wired fiber optic communication as well as wired communication over copper wires. It is noted that hybrid systems may have at least a portion of the communications that is wireless while other portions are in a wired format.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "lasercom," offers an attractive wireless alternative to radio communication, especially when point-to-point communication is required. Notably, the non-dispersed, focused character of laser communication intrinsically avoids most of the problems that are associated with radio communication. In particular, there is no need to assign frequency bands to lasercom users, because interference between laser signal beams is avoided so long as two beams are not directed to the same recipient. Laser signals experience very little attenuation as a function of distance, because the signal energy remains tightly focused in a beam. Communication security is also intrinsically high, as the interception of and interference with laser communications requires direct interception of a laser communication beam and/or focusing jamming beams directly at an intended signal receiver.

One important application that can benefit significantly from lasercom is satellite communications, where line-of-sight access is generally available, and where the communication distances are very great. Lasercom can provide communication data rates for satellites that are much higher than radio data rates, with unmatched anti-jam characteristics and an inherently low risk of communications intercept. Lasercom also eliminates the need for frequency planning and authorization, and circumvents the highly congested RF spectrum bandwidth constraints that limit the practical data rates available to users of RF links.

FIG. 1 depicts a prior art satellite lasercom environment 100. Laser communications can be used for multi-Gbps (Giga-bits per second) connections 105 between space platforms 110, as well as connections 115 between ground-based nodes 120 and space platforms 110, owing to the availability of efficient, multi-watt laser sources and exceedingly high antenna gain, having beam widths of only 10-20 micro-radians and telescope apertures that are only four to eight inches in diameter. Even when much lower data rates of tens to hundreds of mega-bits per second (Mbps) are of interest, lasercom may be desirable due to its inherent Low Probability of Intercept (LPI), Low Probability of Detection (LPD), and anti-jam communications link security.

It should be noted that the disclosure herein is mainly presented with reference to satellite communication. However, it will be understood by those of skill in the art that the present disclosure is not limited to satellite communication, but also applies to other implementations of laser communication and optical payloads.

Of course, there are certain problems associated with laser communication that arise specifically from the very narrow divergence, extreme directionality, of laser beams. In particular, it is necessary for communicating nodes to identify each other and align their lasers so as to effectively communicate. In the case of satellite lasercom, these identification and alignment problems are especially acute, because laser sources that are well separated by terrestrial standards, for example several miles apart from each other may nevertheless appear to be almost geographically overlapping from the viewpoint of a satellite. Furthermore, thermal, Doppler, and atmospheric effects can lead to both frequency (wavelength) and angular (apparent location) shifting of an incident laser communication beam, even after it is identified and aligned. The angular vibrational effects, together with other short-term mechanical instabilities of the satellite or other receiving node, are referred to herein collectively as "jitter."

FIG. 2 is a flow chart depicting steps 200 to establish and maintain prior art laser communications. There are at least four steps to establish and maintain laser communications. First, a candidate light source, referred to herein as a "hot spot," is identified from within a scene of interest 205. Second, the hot spot is verified as being a communication signal and its transmission source is identified so as to determine if it is a signal of interest (verify it is a beacon or communication beam that meets the acquisition criteria) 210. Third, the optics of the lasercom receiving system is aligned with the incoming beam (capture or pull-in of the beacon) 215. Finally, once communication has been established, the beam is tracked during communication so that the alignment is maintained and the communication is not interrupted 220.

What is needed is a device, system, and method to reliably and economically reduce line-of-sight (LOS) jitter based on platform induced motion in cantilevered gimbal systems to provide the pointing stability required by advanced optical systems.

SUMMARY

An embodiment provides a three-loop inertial stabilization system with active jitter suppression and optical control to reduce line-of-sight jitter based on platform induced motion in cantilevered gimbal systems comprising a first loop comprising at least one inertial force actuator; at least one rate sensor; a Kalman state estimator; and a rate to angle module; a second loop comprising a mirror system; a focal plane and centroid processing module; an open-loop closed loop selector; a signal combiner; and a loop integrator; a third loop comprising a fast steering mirror offload module; and at least one gimbal motor driver; whereby the three loops substantially suppress the jitter of the cantilevered gimbal system. Embodiments comprise calibrated measurement and calibrated actuation to track residual mechanical jitter. Other embodiments further comprise a state-space model of at least one gimbal. Subsequent embodiments comprise at least one voicecoil actuator located to actively cancel vibrations sensed with an on payload inertial measurement unit. For additional embodiments the first loop comprises a fast steering mirror. In another embodiment, the at least one rate sensor comprises at least one ARS-14 rate sensor. For a following embodiment the at least one rate sensor comprises a plurality of rate sensors. In subsequent embodiments the at least one rate sensor comprises at least one rate sensor on a bench of the system. In additional embodiments the at least one gimbal motor driver comprises a plurality of gimbal motor drivers.

Another embodiment provides a method for three-loop inertial stabilization with active jitter suppression and optical control to reduce line-of-sight jitter based on platform induced motion in cantilevered gimbal systems comprising a first loop comprising dampening resonances by inertial actuators; a second loop comprising tracking out residual jitter; and a third loop comprising driving a plurality of stepper motors to keep a fast steering mirror near a middle of its dynamic range; whereby the three loops substantially suppress the jitter of the cantilevered gimbal system. Included embodiments comprise calibrated measurement and calibrated actuation to accurately track residual mechanical jitter. In yet further embodiments the first loop comprises providing measured rates EL and XL produced by rate sensors to a Kalman state estimator module; providing four amplitude and four rate modes by the Kalman state estimator; inputting the four amplitude and the four rate modes to a linear quadratic regulator; producing an output of four stators and four masses forces by the linear quadratic regulator; and inputting the four stators and the four masses forces to a state-space model of a gimbal. In related embodiments the second loop comprises receiving an input laser beam at a mirror system; receiving bus inertial data at an open -closed-loop selector; outputting the received input laser beam from the mirror system to a focal plane and centroid processing module; outputting focal plane and centroid processing to the open-loop closed-loop selector; providing a DC coupled output from the open-loop closed-loop selector to a signal combiner; inputting measured rates EL and XL from rate sensors to a rate to angle module; inputting an AC coupled output from the rate to angle module to a signal combiner; inputting output from the signal combiner to a loop integrator; inputting output from the loop integrator to the fast steering mirror; and inputting output from the fast steering mirror to the mirror system. For further embodiments, the third loop comprises receiving input to a fast steering mirror offload module from a loop integrator output; receiving input to gimbal motor drivers from the fast steering mirror offload module; receiving input of two stators' and two rotors' torques at a state-space model of a gimbal from gimbal motor drivers. In ensuing embodiments open-loop pointing accuracy is about 100 μrad 1 σ. For yet further embodiments an inertial measurement unit is operated in a null mode whereby linearity requirements on the inertial measurement unit are reduced. For more embodiments, compensated jitter comprises 35 μrad 2 millisecond steps of the gimbal motors. Continued embodiments include gain increased at frequencies between 30 and 300 Hz. For additional embodiments, residual broadband jitter is suppressed by a fast steering mirror at a high speed and a small dynamic range.

A yet further embodiment provides a three-loop inertial stabilization system with active jitter suppression and optical control to reduce line-of-sight jitter based on platform induced motion in cantilevered gimbal systems comprising a first loop comprising at least one inertial force actuator; providing measured rates EL and XL produced by rate sensors to a Kalman state estimator module; providing four amplitude and four rate modes by the Kalman state estimator; inputting the four amplitude and the four rate modes to a linear quadratic regulator; producing an output of four stators and four masses forces by the linear quadratic regulator; and inputting the four stators and the four masses forces to a state-space model of a gimbal; a second loop comprising receiving an input laser beam at a mirror system; receiving bus inertial data at an open - closed-loop selector; outputting the received input laser beam from the mirror system to a focal plane and centroid processing module; outputting focal plane and centroid processing to an open-loop closed-loop selector; providing a DC coupled output from the open-loop closed-loop selector to a signal combiner; inputting measured rates EL and XL from rate sensors to a rate to angle module; inputting an AC coupled output from the rate to angle module to a signal combiner; inputting output from the signal combiner to a loop integrator; inputting output from the loop integrator to a fast steering mirror; and inputting output from the FSM to the mirror system; a third loop comprising receiving input to a fast steering mirror offload module from a loop integrator output; receiving input to gimbal motor drivers from the fast steering mirror offload module; and receiving input of two stators' and two rotors' torques at a state-space model of a gimbal from gimbal motor drivers; wherein calibrated measurement and calibrated actuation track residual mechanical jitter; and whereby the three loops substantially suppress the jitter of the cantilevered gimbal system.

Figure 1:
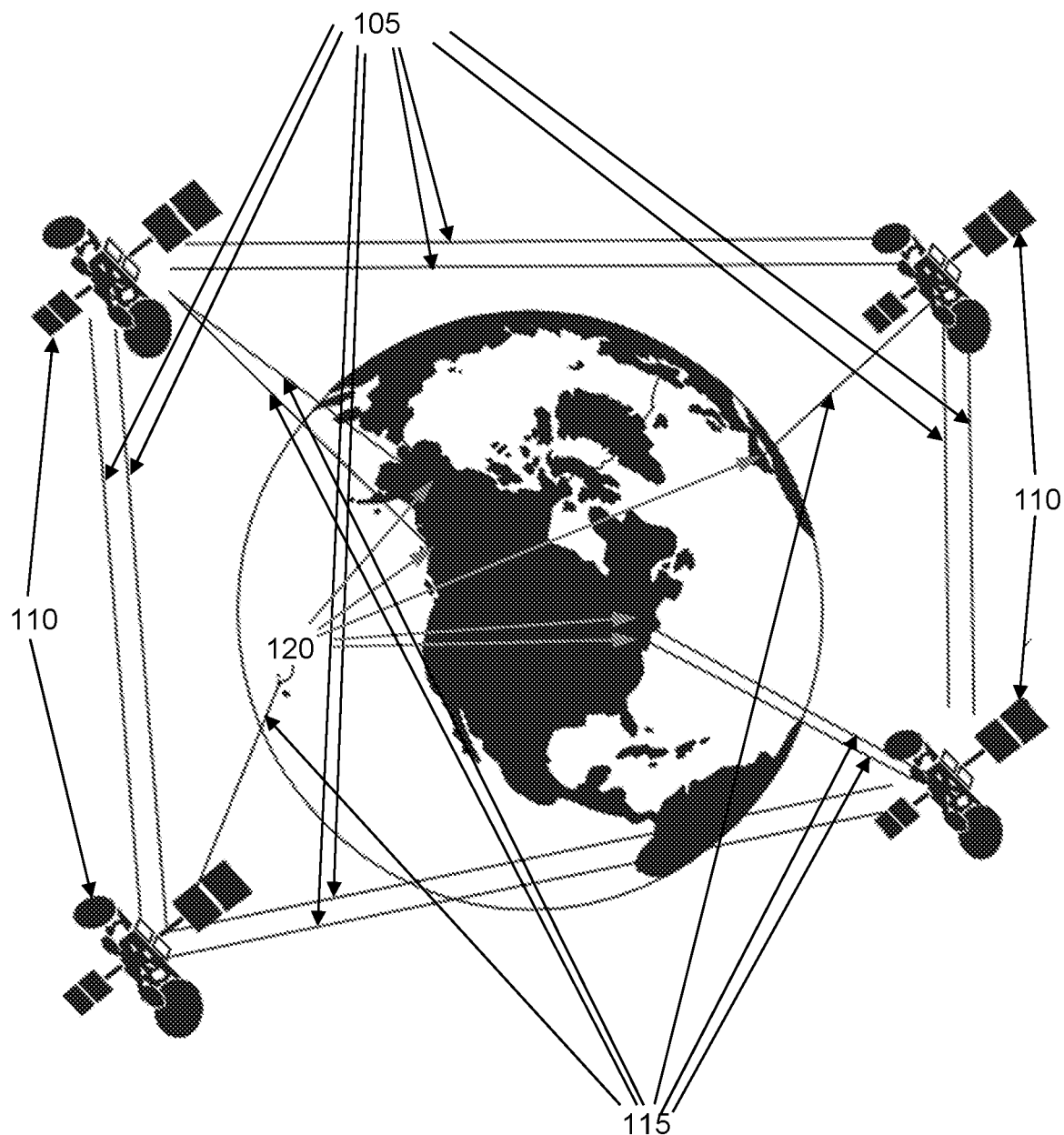
FIG. 1 illustrates prior art lasercom communication between orbiting satellites, and between the satellites and ground-based nodes.
Figure 2:
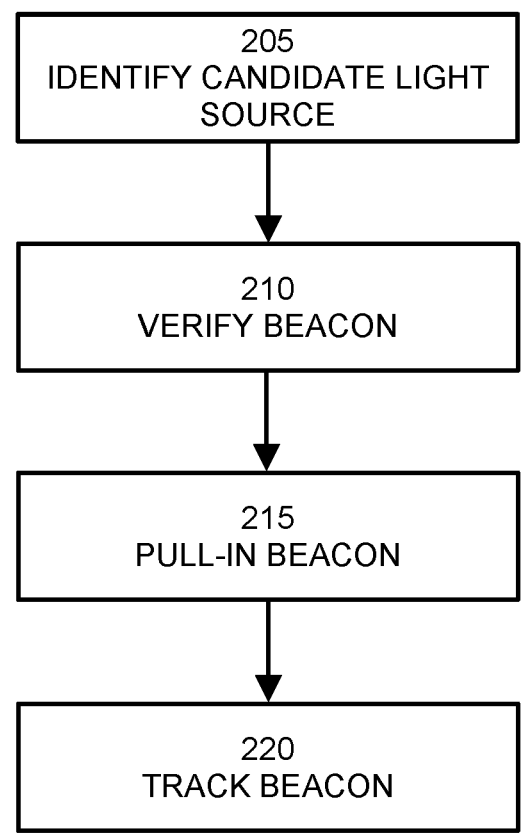
FIG. 2 is a generalized flow chart illustrating steps for aligning a prior art lasercom receiving system with a transmitting node.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Each of U.S. Pat. Application No. 15/457,081 filed Mar. 13, 2017 titled Celestial Navigation Using Laser Communication System; Application No. 15/968,083 filed May 1, 2018 titled Apparatus and Method for Rapid Identification of Laser Communication Beacons; Application No. 16/000,991 filed Jun. 6, 2018 titled Apparatus and Method for Rapid Identification of Laser Communication Beacons; Application No. 16/001,225 filed Jun. 6, 2018 titled Flexible Design for a Tunable Optical Filter (TOF) Processing Block; Application No. 16/002,052 filed Jun. 7, 2018 titled Apparatus and Method for Rapid Identification of Candidate Laser Communication Beacons, Application No. 16/003,690 filed Jun. 8, 2018 titled Pointing Control with Fiber Nutation and Application No. 16/122,999 filed Sep. 6, 2018 titled Acquisition and Pointing Device, System, and Method Using Quad Cell, and Application No. 16/204,036 filed Nov. 29, 2018 titled Space Lasercom Optical Bench is herein incorporated by reference in its entirety for all purposes.

A low cost reliable cantilevered gimbal system yields significant line-of-sight (LOS) jitter based on platform induced motion. Satellite payloads demand high reliability while driving to low cost solutions. The challenge is to enable these low cost reliable gimbal systems to provide the pointing stability required by advanced optical systems. Embodiment solutions use small voicecoil actuators strategically located to actively cancel vibrations sensed with an on payload inertial measurement unit (IMU). The optical LOS jitter is further reduced by driving a fast steering mirror (FSM) to compensate for the residual mechanical jitter to stabilize the optical line-of-sight (LOS). This balances mechanical and optical LOS jitter suppression. The active mechanical jitter suppression is very effective at reducing large amplitude resonant contributions, and allows the IMU to be operated in a null mode that minimizes linearity requirements on the IMU. The residual broadband jitter is suppressed to a larger extent by a FSM which can be much higher speed because it requires a smaller dynamic range (as result of active jitter suppression).

Figure 3:
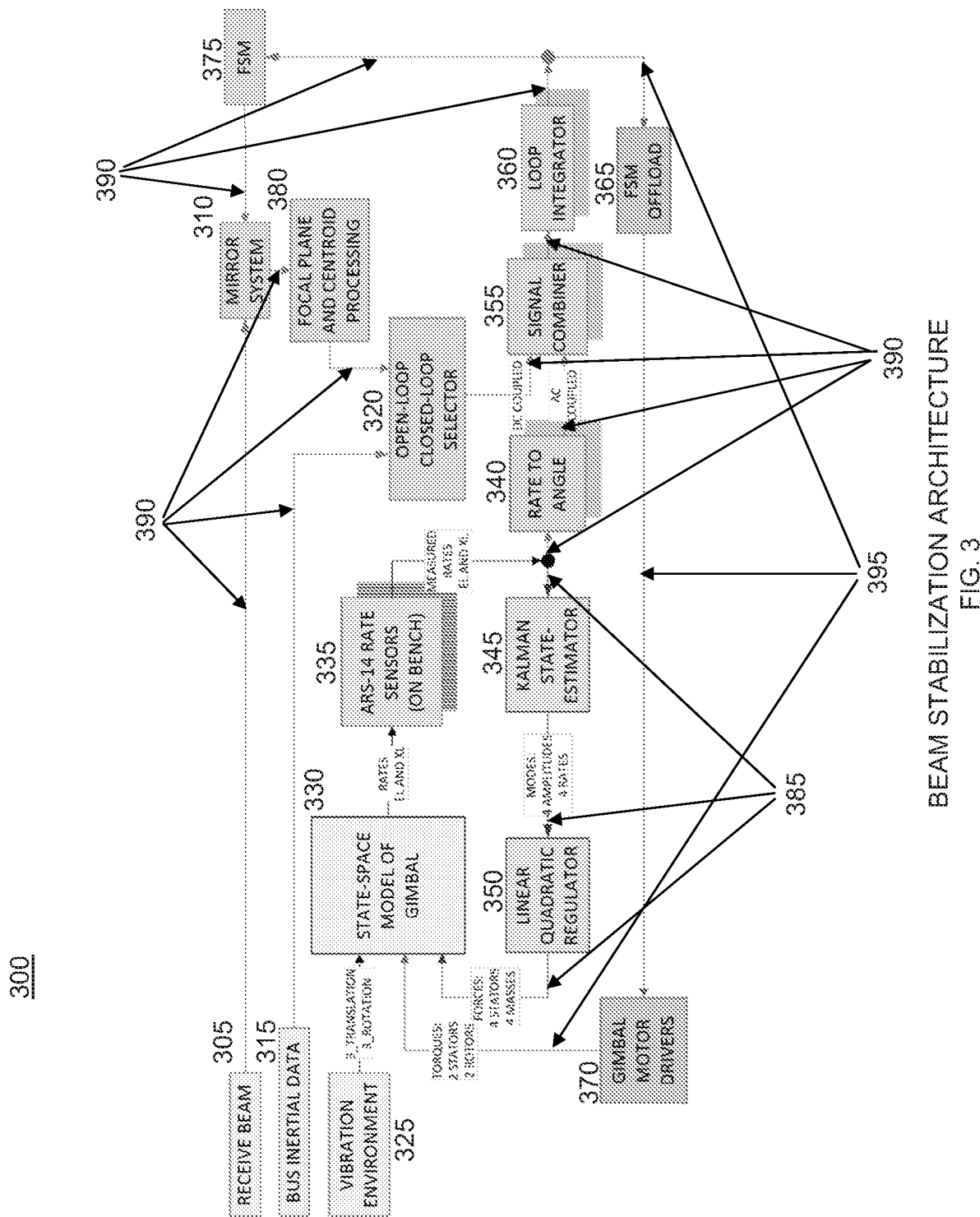
FIG. 3 depicts a beam stabilization architecture configured in accordance with an embodiment.

FIG. 3 depicts a beam stabilization architecture embodiment 300. The device architecture comprises an incoming receive beam 305 providing input to a mirror system 310. In overall operation, the First Loop 385 reduces the mechanical jitter of the optical bench using inertial actuators to dampen resonances. The Second Loop 390 stabilizes the laser beam by tracking out the residual jitter left by the First Loop 385. The Third Loop 395 drives the stepper motors to keep the FSM near the middle of its dynamic range. Particularly, bus inertial data 315 provides input to an open-loop closed-loop selector 320. A vibration environment 325 provides three translation and three rotation inputs to a state-space model of gimbal 330, having gimbal angles azimuth (AZ), elevation (EL) and cross-elevation (XL). The state-space model of gimbal 330 provides EL & XL rates to acoustic rate sensors 335 (located on the optical bench). In one example the acoustic rate sensors are ARS-14 MHD angular rate sensors from Applied Technology Associates. The measured rates EL and XL produced by the acoustic rate sensors 335 are sent to a Kalman state estimator 345 and a rate to angle module 340. The Kalman state estimator 345 provides four amplitude and four rate modes as inputs to a linear quadratic regulator 350. The linear quadratic regulator 350 output of four stators and four masses forces is input to a state-space model of gimbal 330. The rate to angle module 350 is AC-coupled to signal combiner 355. The open-loop closed loop selector 320 is DC-coupled to a signal combiner 355. The output of the signal combiner 355 is input to a loop integrator 360. The output of the loop integrator 360 is sent to a fast steering mirror (FSM) 375 and FSM offload module 365. The output of FSM offload module 365 is input to gimbal motor drivers 370. The gimbal motor drivers 370 output of two stators' and two rotors' torques is input to the state-space model of gimbal 330. The output from the FSM 375 is input to the mirror system 310. The output of mirror system 310 is input to a focal plane and centroid processing module 380. The output of the focal plane and centroid processing module 380 is input to the open-loop closed-loop selector 320. Embodiments use balancing to minimize the raw mechanical jitter applied to this system of stabilization loops. Restating, the First Loop 385 reduces the mechanical jitter of the optical bench using inertial actuators to dampen resonances. The Second Loop 390 stabilizes the laser beam by tracking out the residual jitter left by the First Loop 385. The Third Loop

395 drives the stepper motors to keep the FSM near the middle of its dynamic range.

Certain embodiments suppress jitter on receive and transmit beams to below 0.8 μrad RMS. In one example, vibration from the bus is the major source of disturbance. Gimbal resonances excited by translation vibration need suppression. Stepping gimbal motors are a secondary source of disturbance. Each step transitions 35 μrad in 2 milliseconds. Embodiments provide open-loop pointing with a maximum error of ± 1 milliradian. Hard-mounting the gimbal is favored for two reasons: maintaining pointing accuracy and avoiding high level of rocking due to isolator resonance. One of the embodiments employs a three stage approach. Stage 1, balance by bringing the center-of-gravity near or on the azimuth rotation axis. In embodiments, this is done to suppress excessive non-resonant flexure on the azimuth rotation axis. Stage 2 is a nulling process, reducing mechanical jitter of the optical bench using inertial actuators to reduce it to within the dynamic range of the fast steering mirror (FSM). Gimbal motors are also contributing by providing low-frequency large angle corrections to keep the FSM nominally centered. Stage 3 comprises a tracking process, measuring the residual jitter, and canceling it with the FSM. Calibrated measurement and calibrated actuation are used to accurately track the residual mechanical jitter.

Figure 4:
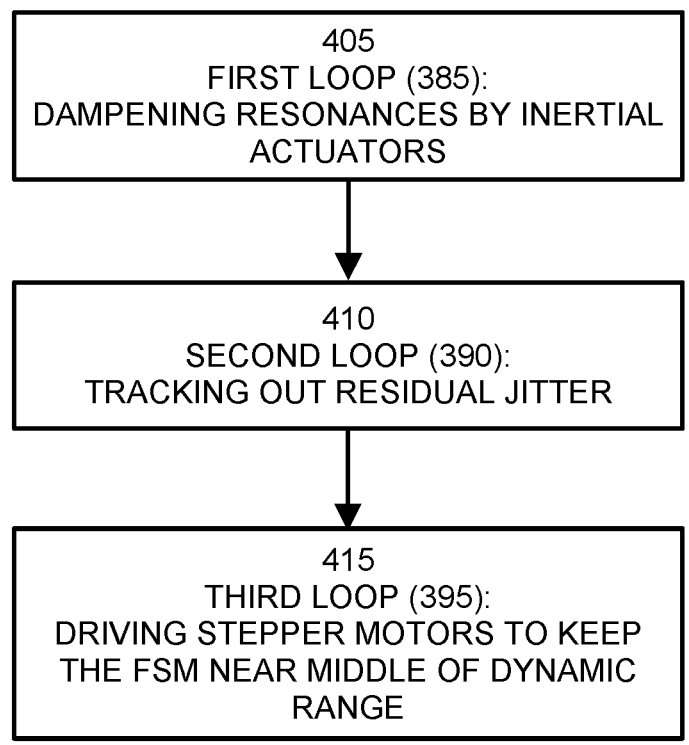
FIG. 4 is a high level flow chart for a beam stabilization method configured in accordance with an embodiment.

FIG. 4 is a high level flow chart for a beam stabilization method 400. The method comprises a first loop 405 (represented as 385 in FIG. 3, and detailed in FIG. 5) reducing the mechanical jitter of the optical bench using inertial actuators to dampen resonances. Second loop 410 (represented as 390 in FIG. 3, and detailed in FIG. 6) stabilizes the laser beam by tracking out the residual jitter left by the first loop 405. Third loop 415 (represented as 395 in FIG. 3, and detailed in FIG. 7) drives the stepper motors to keep the FSM near the middle of its dynamic range.

Figure 5:
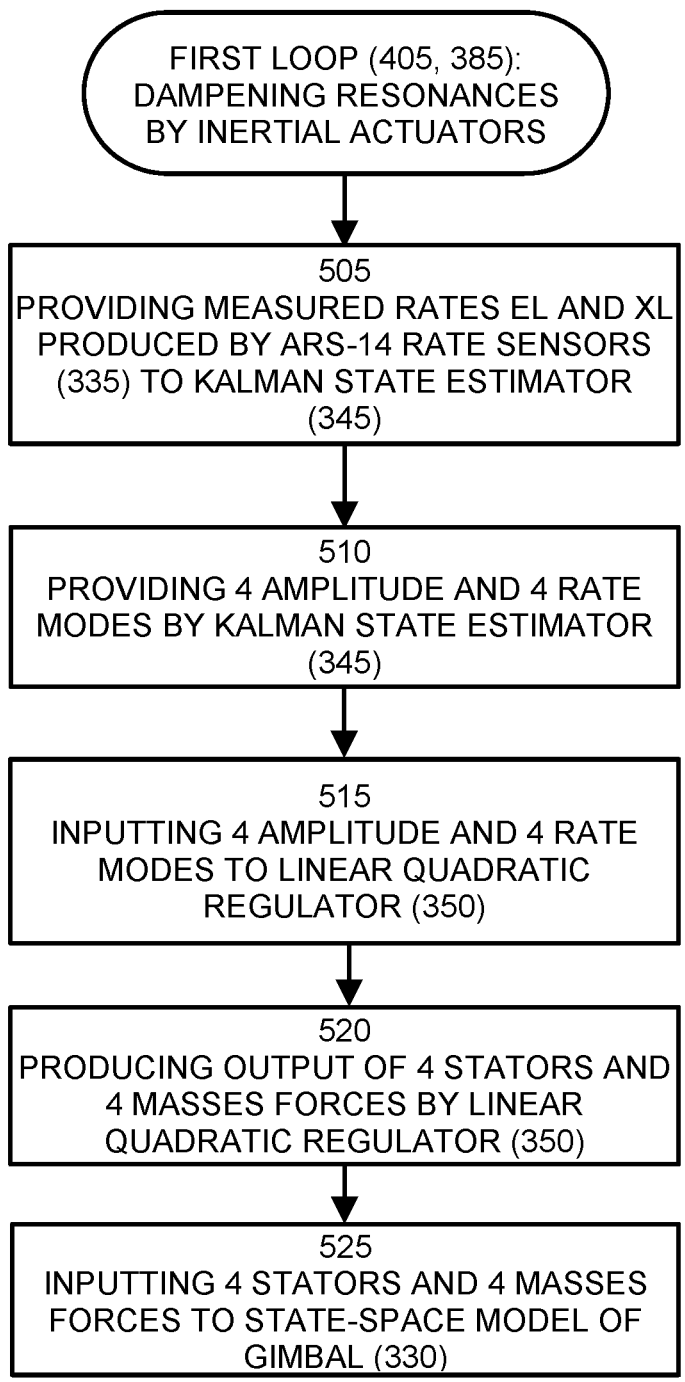
FIG. 5 is a flow chart depicting details of FIG. 4, First Loop configured in accordance with an embodiment.

FIG. 5 is a flow chart 500 depicting details of FIG. 4, First Loop step 405 (from FIG. 3, 385). The First Loop reduces the mechanical jitter of the optical bench using inertial actuators to dampen resonances. In embodiments, actuators are placed at four corners of a strongback. Steps comprise providing measured rates EL and XL produced by acoustic rate sensors (335) to the Kalman state estimator (345) 505; the Kalman state estimator (345) providing four amplitude and four rate modes 510; as input to a linear quadratic regulator (350) 515; the linear quadratic regulator (350) producing an output of four stators and four masses forces 520; which are input to a state-space model of gimbal (330) 525.

Figure 6:
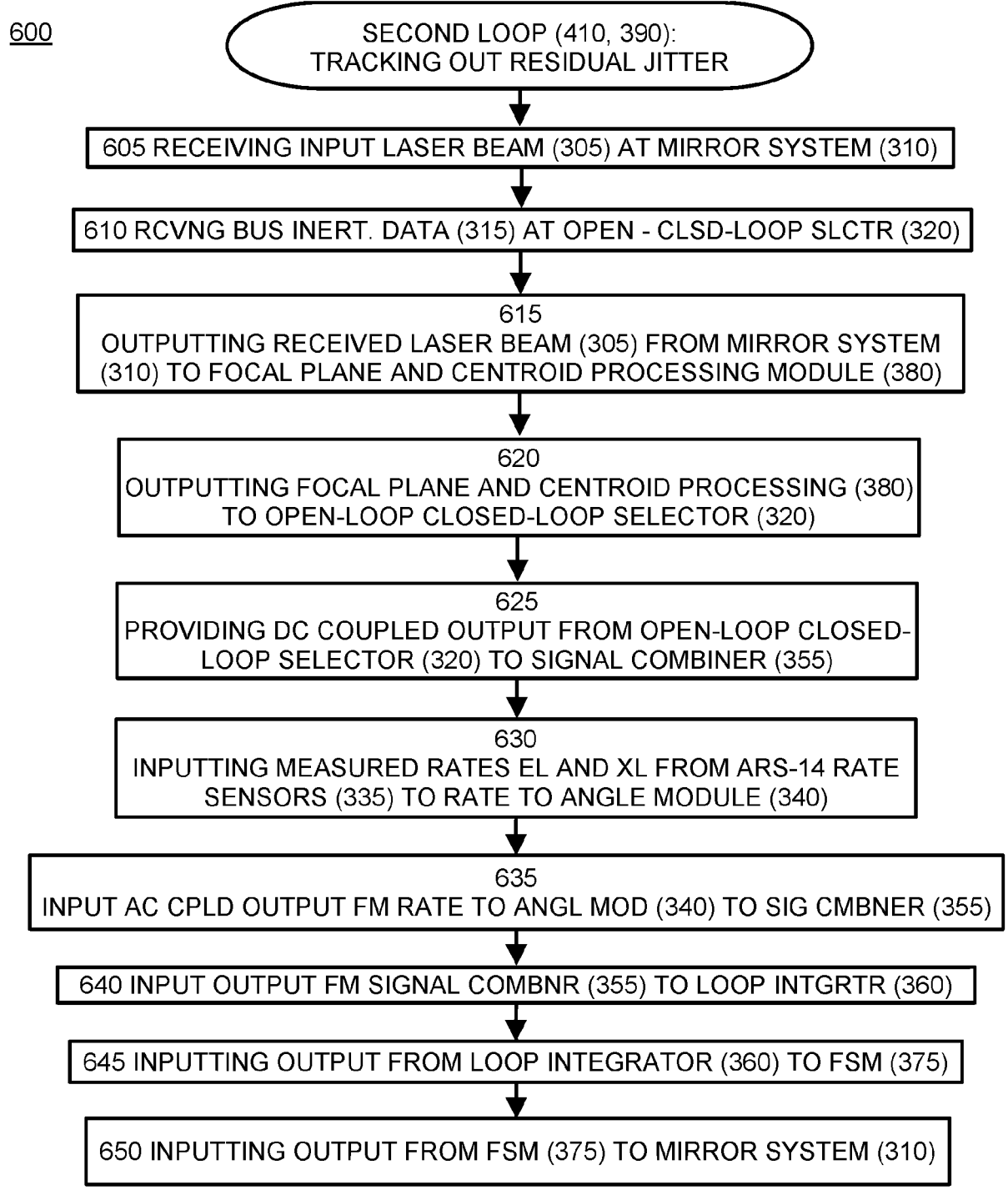
FIG. 6 is a flow chart depicting details of FIG. 4, Second Loop step configured in accordance with an embodiment.

FIG. 6 is a flow chart 600 depicting details of FIG. 4, the Second Loop step 410 (from FIG. 3, 390). The Second Loop stabilizes the laser beam by tracking out the residual jitter left by the First Loop. The steps comprise: receiving an input laser beam (305) at a mirror system (310) 605; receiving bus inertial data (315) at an open-loop closed-loop selector (320) 610; outputting the received laser beam (305) from the mirror system (310) to a focal plane and centroid processing module (380) 615; outputting the focal plane and centroid processing (380) to the open-loop closed-loop selector (320) 620; providing a DC coupled output from open-loop closed-loop selector (320) to a signal combiner (355) 625; inputting the measured rates EL and XL from the acoustic rate sensors (335) to a rate to angle module (340) 630; inputting an AC coupled output from the rate to angle module (340) to the signal combiner (355) 635; inputting the output from the signal combiner (355) to a loop integrator (360) 640; inputting the output from loop integrator (360) to a FSM (375) 645; inputting the output from the FSM (375) to the mirror system (310) 650.

Figure 7:
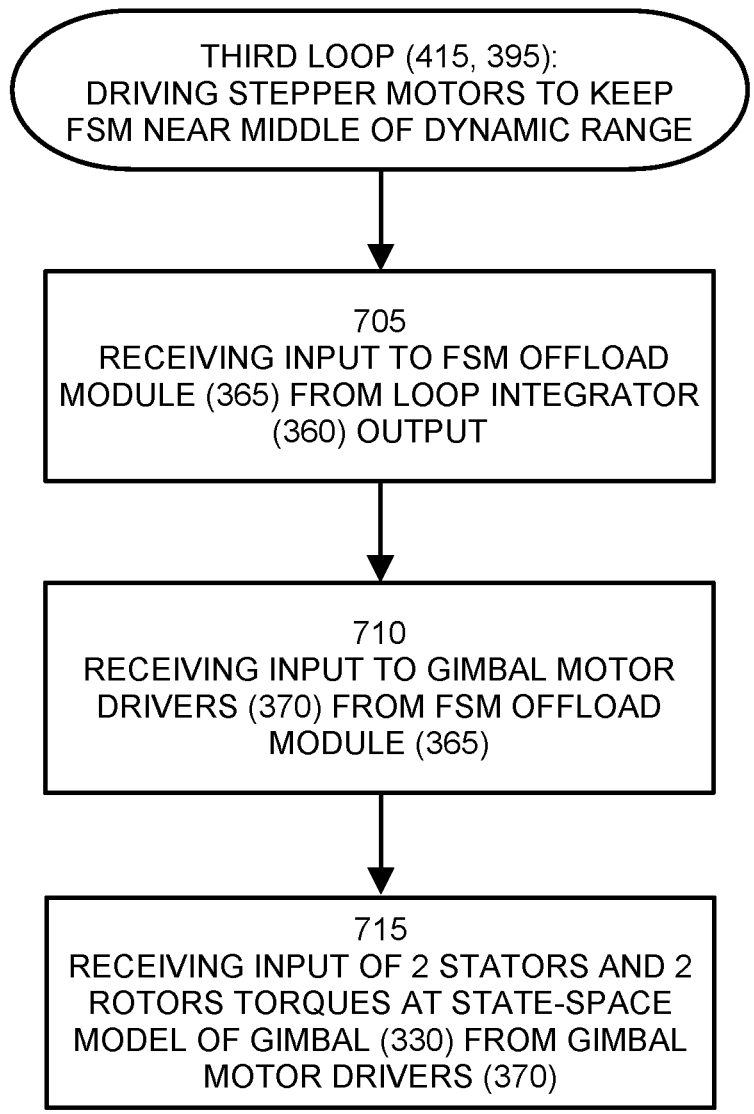
FIG. 7 is a flow chart depicting details of FIG. 4, Third Loop configured in accordance with an embodiment.

FIG. 7 is a flow chart 700 depicting details of FIG. 4, Third Loop step 410 (from FIG. 3, 395). The Third Loop drives the stepper motors to keep the FSM near the middle of its dynamic range. Steps comprise: receiving an input to the FSM offload module (365) from the loop integrator (360) output 705; receiving an input to gimbal motor drivers (370) from the FSM offload module (365) 710; and receiving an input of two stators and two rotors torques at state-space model of gimbal (330) from gimbal motor drivers (370) 715.

Figure 8:
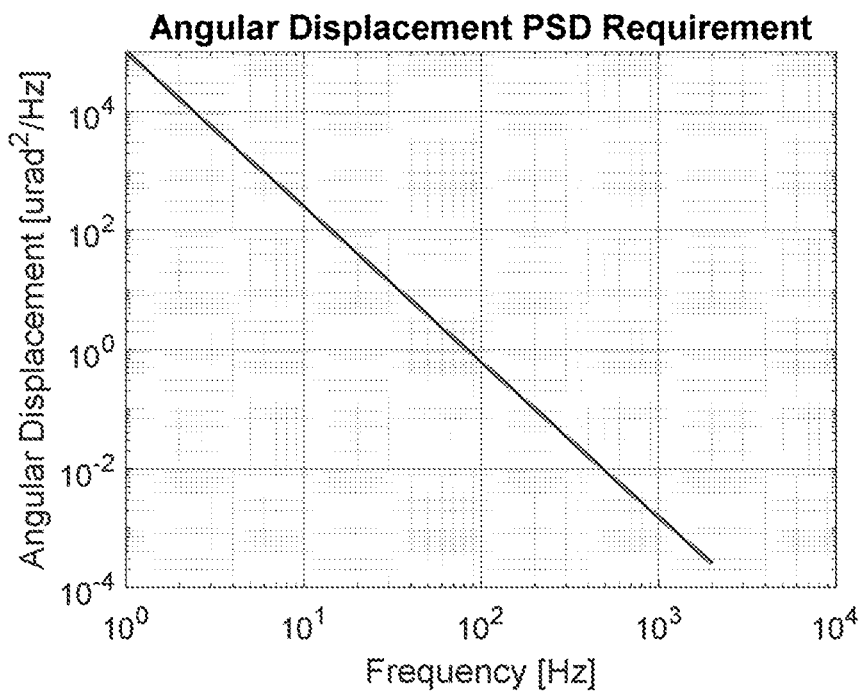
FIG. 8 depicts an angular vibration environment configured in accordance with an embodiment.

FIG. 8 depicts an angular vibration environment 800. Jitter reduction is based on the input of the angular vibration depicted. An independent instance of this input is applied to each of the three rotation axes.

Figure 9:
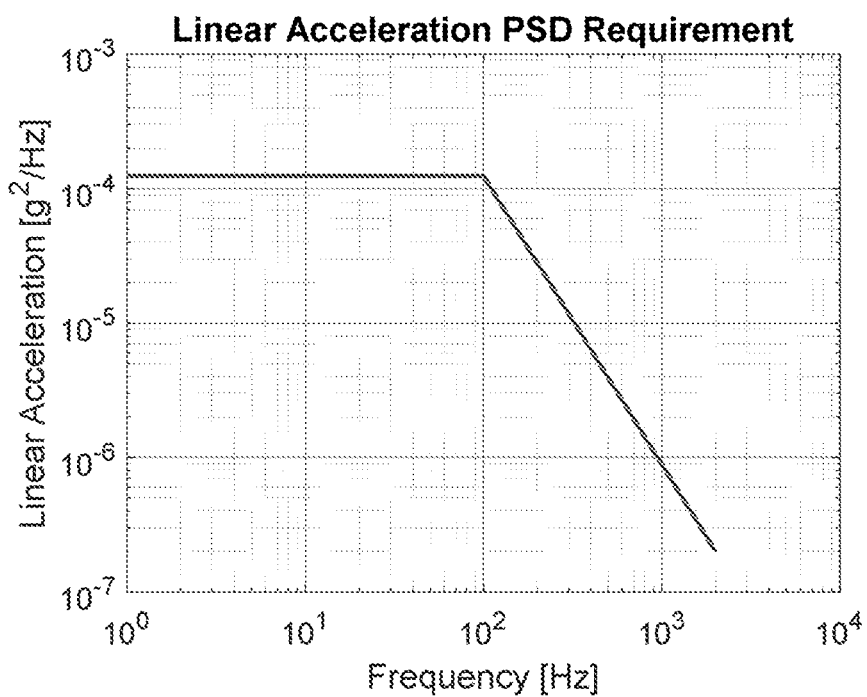
FIG. 9 depicts a linear vibration environment configured in accordance with an embodiment.

FIG. 9 depicts a linear vibration environment 900. Jitter reduction is further based on the input of the linear acceleration vibration depicted. An independent instance of this input is applied to each of the three linear axes.

Figure 10:
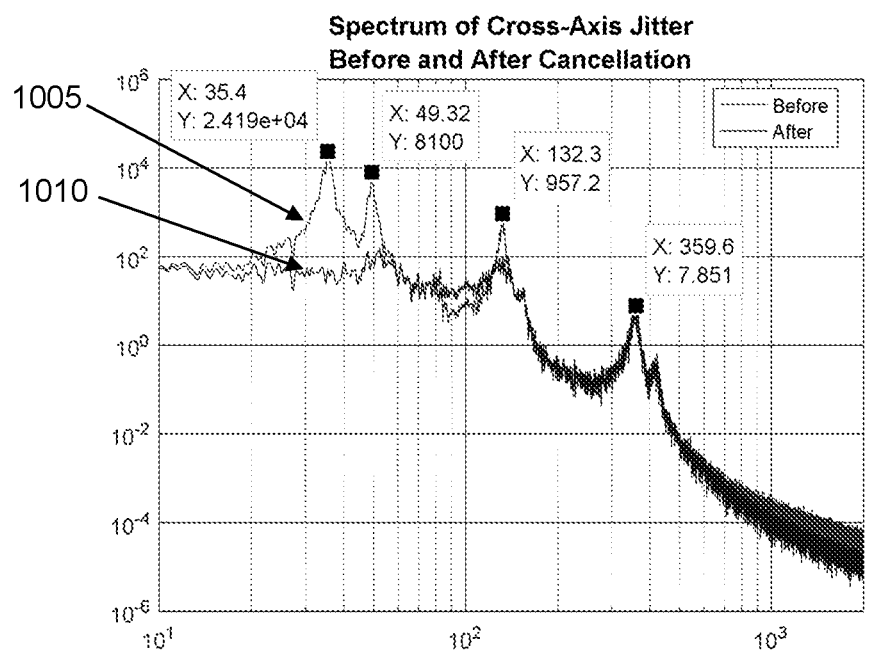
FIG. 10 depicts jitter reduction with inertial actuators configured in accordance with an embodiment.
Figure 10:
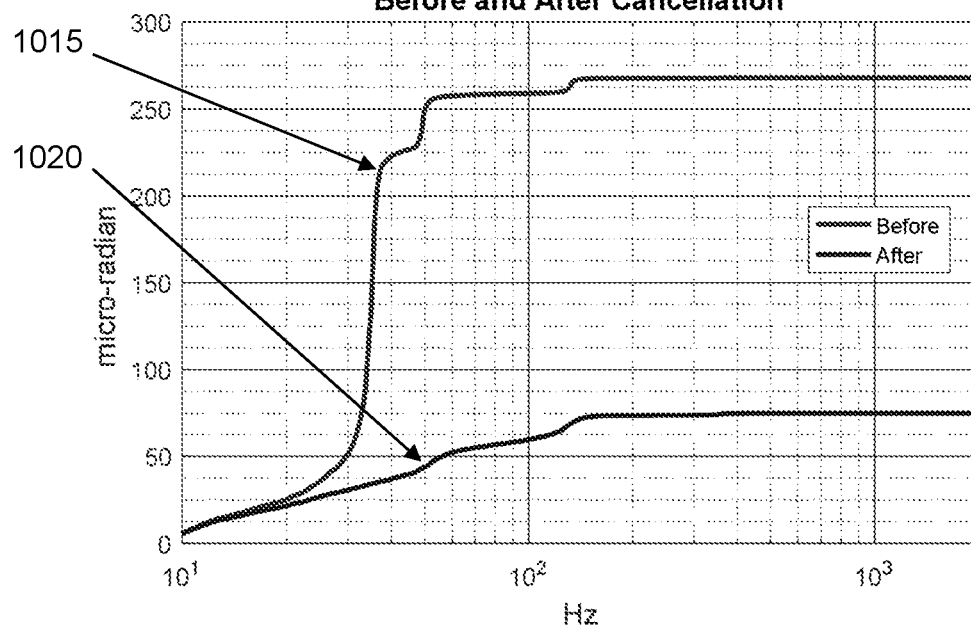

FIG. 10 depicts jitter reduction with inertial actuators 1000. A State-Space Simulink model based on a finite-element CAD model of the gimbal shows a reduction of vibration-induced jitter to a level within the FSM dynamic range. Actuator embodiments provide a one pound zero-peak continuous force output at high frequency with a primary resonant frequency of 40 Hz. In one example, four units of MOOG SA1-V40 actuators are used. Actuators are placed at four corners of the strongback. The jitter is shown as before 1005 and after 1010 inertial actuators are used and the cumulative cross-axis jitter before 1015 and after 1020 use.

Figure 11:
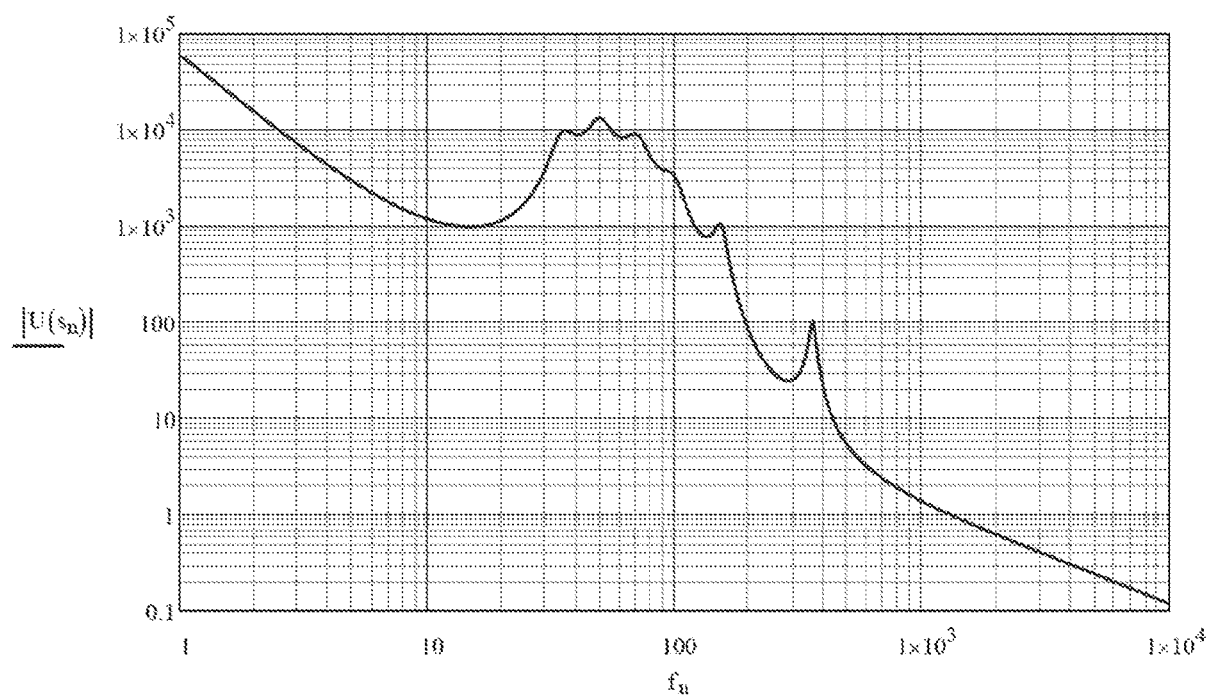
FIG. 11 depicts loop filter jitter reduction configured in accordance with an embodiment.

FIG. 11 depicts loop filter jitter reduction 1100. This gain plot depicts the open-loop gain for the FSM loop that tracks out residual jitter. The loop crosses unity-gain at 1200 Hz (as high as FSM resonance will allow). In embodiments, to get adequate reduction of residual jitter, the gain is bumped up at frequencies between 30 and 300 Hz. The bump-up filter stages diminish at the unit-gain crossover frequency to maintain loop stability. With this filter in place, the jitter on the Line-of-Sight (LOS) of the receive beam was reduced to 0.79 μrad RMS. In embodiments, LOS jitter included the 35 μrad 2 millisecond steps of the gimbal motors. Improved gimbal balance would provide more margin to allow errors in the acoustic rate sensors and strain-gauge.

Figure 12:
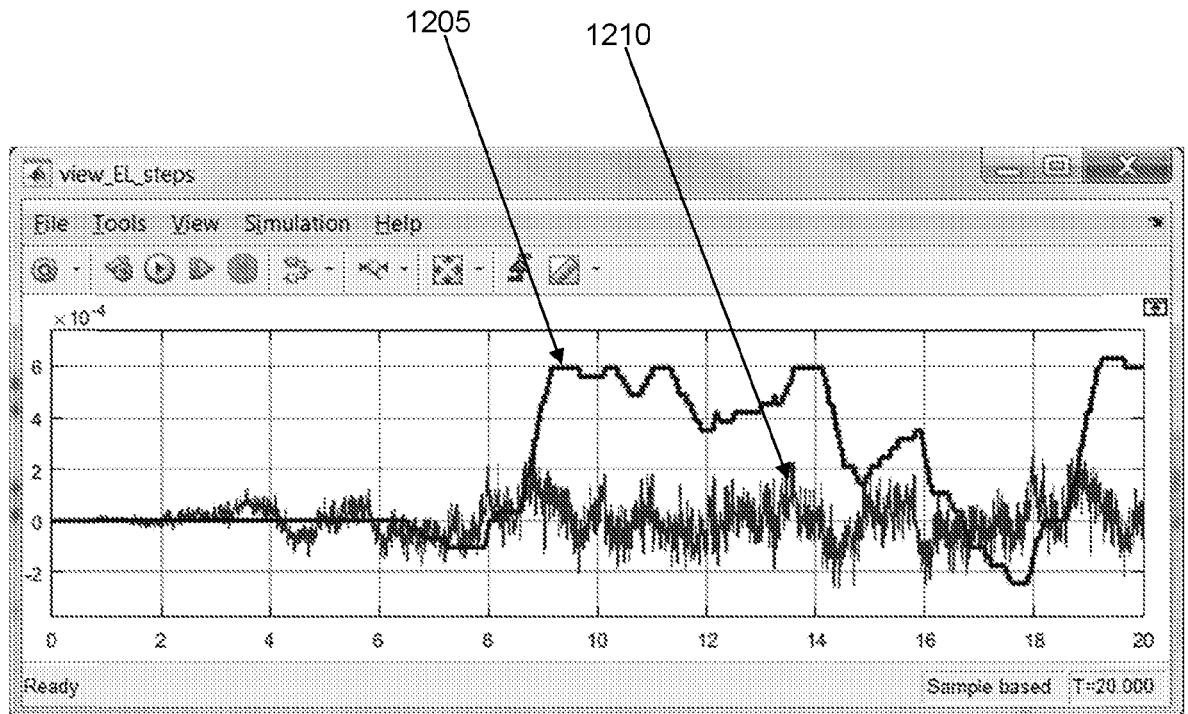
FIG. 12 depicts a gimbal motor waveform configured in accordance with an embodiment.

FIG. 12 depicts a gimbal motor waveform 1200. The depicted waveform is a sample of the action of the FSM off-load function. Waveform 1205 is the angle of the elevation stepper motor as jitter is being tracked out. Waveform 1210 is the input to the off-load function (FSM angle signal). The angles are presented in free-space scale units. Vibration disturbance ramps up for the first 10 seconds, and remains full for remainder of time.

The computing system used for the platform-induced motion in cantilevered gimbal structures line-of-sight (LOS) jitter reduction system for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for three-loop inertial stabilization with active jitter suppression and optical control to reduce line-of-sight jitter based on platform induced motion in a gimbal system, the method comprising:
dampening resonances by inertial actuators utilizing a first loop;
tracking out residual jitter utilizing a second loop; and
driving a plurality of stepper motors to keep a fast steering mirror near a middle of its dynamic range utilizing a third loop;
whereby said three loops substantially suppress said line-of-sight jitter of said gimbal system.

2. The method of claim 1, further comprising:
using calibrated measurement and calibrated actuation to accurately track residual mechanical jitter.

3. The method of claim 1, wherein said first loop comprises:
providing measured rates elevation (EL) and cross-elevation (XL) produced by rate sensors to a Kalman state estimator module;
providing four amplitude and four rate modes by said Kalman state estimator;
inputting said four amplitude and said four rate modes to a linear quadratic regulator;
producing an output of four stators and four masses forces by said linear quadratic regulator; and
inputting said four stators and said four masses forces to a state-space model of a gimbal.

4. The method of claim 1, wherein said second loop comprises:
receiving an input laser beam at a mirror system;
receiving bus inertial data at an open-loop closed-loop selector;
outputting received said input laser beam from said mirror system to a focal plane and centroid processing module;
outputting a focal plane and centroid processing to said open-loop closed-loop selector;
providing a direct current (DC) coupled output from said open-loop closed-loop selector to a signal combiner;
inputting measured rates EL and XL to a rate to angle module;
inputting an alternating current (AC) coupled output from said rate to angle module to said signal combiner;
inputting an output from said signal combiner to a loop integrator;
inputting an output from said loop integrator to said fast steering mirror; and
inputting an output from said fast steering mirror to said mirror system.

5. The method of claim 1, wherein said third loop comprises:
receiving an input to a fast steering mirror offload module from a loop integrator output;
receiving an input to gimbal motor drivers from said fast steering mirror offload module;
receiving an input of two stators' and two rotors' torques at a state-space model of a gimbal from a gimbal motor driver.

6. The method of claim 1, further comprising:
suppressing jitter on receive and transmit beams to below 0.8 μrad RMS.

7. The method of claim 1, further comprising:
operating an inertial measurement unit in a null mode whereby linearity requirements on said inertial measurement unit are reduced.

8. The method of claim 1, further comprising:
accounting for a secondary disturbance of said gimbal motors wherein each said gimbal motor includes 35 μrad 2 millisecond steps.

9. The method of claim 1, further comprising:
increasing a gain to frequencies between 30 and 300 Hz.

10. The method of claim 1, further comprising:
suppressing residual broadband jitter by a fast steering mirror at a high speed and a small dynamic range.

11. A computer program product including one or more non-transitory machine readable mediums having instructions encoded thereon that when executed by one or more processors, result in a three-loop inertial stabilization system with active jitter suppression and optical control to reduce line-of-sight jitter based on platform induced motion in cantilevered gimbal systems, the instructions comprising:
executing a first loop comprising:
providing at least one inertial force actuator;
providing measured rates EL and XL produced by rate sensors to a Kalman state estimator module and producing four amplitude and four rate modes by said Kalman state estimator;
inputting said four amplitude and said four rate modes to a linear quadratic regulator and producing an output of four stators and four masses forces by said linear quadratic regulator; and inputting said four stators and said four masses forces to a state-space model of a gimbal;

executing a second loop comprising:

receiving an input laser beam at a mirror system;

receiving bus inertial data at an open loop closed-loop selector;

outputting received said input laser beam from said mirror system to a focal plane and centroid processing module;

outputting focal plane and centroid processing to an open-loop closed-loop selector;

providing a DC coupled output from said open-loop closed-loop selector to a signal combiner;

inputting measured rates EL and XL from rate sensors to a rate to angle module;

inputting an AC coupled output from said rate to angle module to a signal combiner;

inputting output from said signal combiner to a loop integrator;

inputting output from said loop integrator to a fast steering mirror; and inputting output from said FSM to said mirror system;

executing a third loop comprising:

receiving input to a fast steering mirror offload module from a loop integrator output;

receiving input to gimbal motor drivers from said fast steering mirror offload module; and receiving input of two stators' and two rotors' torques at a state-space model of a gimbal from gimbal motor drivers;

wherein calibrated measurement and calibrated actuation track residual mechanical jitter; and whereby said three loops substantially suppress said line-of-sight jitter of said cantilevered gimbal system.

* * * * *